United States Patent [19]
Synnatschke et al.

[11] 3,923,999

[45] Dec. 2, 1975

[54] INSECTICIDAL COMPOSITIONS

[75] Inventors: Gotthard Synnatschke; Walter Gueckel; Falk Rittig, all of Ludwigshafen, Germany

[73] Assignee: Badische Anilin- & Soda-Fabrik Aktiengesellschaft, Ludwigshafen (Rhine), Germany

[22] Filed: Aug. 1, 1973

[21] Appl. No.: 384,627

[30] Foreign Application Priority Data
Aug. 14, 1972 Germany.......................... 2239898

[52] U.S. Cl. ............... 424/300; 424/315; 424/322; 424/334
[51] Int. Cl.² ... A01N 9/12; A01N 9/20; A01N 9/24
[58] Field of Search ........... 424/211, 300, 315, 322, 424/334

[56] References Cited
UNITED STATES PATENTS
2,903,478  9/1959  Lambrech.......................... 424/300

FOREIGN PATENTS OR APPLICATIONS
890,150  2/1962  Germany
918,516  2/1963  Germany OTHER PUBLICATIONS
Chem. Abst. 58, 12471(h)—1963—Light–fast condensation products.
"Pesticides"—Neumeyer et al.—p. 61—1969.

Primary Examiner—Stanley J. Friedman
Assistant Examiner—D. W. Robinson
Attorney, Agent, or Firm—Johnston, Keil, Thompson & Shurtleff

[57]  ABSTRACT
New and valuable insecticide comprising 1-naphthyl-N-methyl carbamate, a solid or liquid carrier and, as a dispersant, a water soluble salt of a phenol or naphthol sulfonic acid, urea and formaldehyde condensate, which is extremely stable in storage and may be mixed with prior art phosphoric ester insecticides, i.e., 0,0-dimethyl-S-(N-methylcarbamoyl-methyl)-phosphorus dithioate.

2 Claims, No Drawings

INSECTICIDAL COMPOSITIONS

The present invention relates to a new and valuable insecticide which is extremely stable in storage and may be mixed with prior art phosphoric ester insecticides.

The use of 1-naphthyl-N-methyl carbamate as an insecticide is known. To extend the spectrum of action of this insecticide it is often desirable to add other insecticides to the aqueous dispersion ready for spraying.

The formulations of the above active ingredient, usually employing lignin sulfonates as dispersants, have two serious drawbacks which considerably limit its application possibilities:
1. The formulations do not store well from a physical viewpoint, i.e., their ability to form stable dispersions on being diluted with water deteriorates extremely rapidly; when formulations are sprayed which have been stored for a fairly long period the nozzles then block.
2. It is impossible to use the said active ingredient in admixture with prior art phosphoric ester insecticides, particularly O,O-dimethyl-S-(N-methylcarbamoylmethyl)-phosphorus dithioate as coarse flocculation occurs almost instantaneously on preparation of the spray liquor, the flocks either floating to the surface or settling out of the suspension.

There has been no lack of research work into the overcoming of these drawbacks, for instance German Printed Application DAS 1,908,331 (Wyandotte Chemicals Corp.) relates to stabilizers based on esters of polybasic acids with an oxyalkylene polyol having hydroxyl end groups of the formula:

$HO(C_2H_4O)_a(C_3H_6O)_b(C_2H_4O)_cH$. However, the disadvantage of the products described in that application is that they tend to stick when formulations containing a high percentage of 1-naphthyl-N-methyl carbamate are ground.

We have now found that an insecticide based on 1-naphthyl-N-methyl carbamate as active ingredient and conventional solid or liquid carriers does not have the abovementioned drawbacks when it contains, as dispersants and in the form of their water-soluble salts, condensation products of substituted or unsubstituted phenolsulfonic acids and/or substituted or unsubstituted naphtholsulfonic acids with urea and formaldehyde.

Examples of substituted or unsubstituted phenolsulfonic acids are sulfonic acids of phenol, cresol, ethylphenol, propylphenol, butylphenol and tert-n-butylphenol.

Examples of substituted or unsubstituted naphtholsulfonic acids are sulfonic acids of naphthol, monopropyl-, dipropyl-, n-propyl-, isopropyl-, butyl-, propylhexyl- and hexylheptylnaphthol.

Condensation of the phenolsulfonic and/or naphtholsulfonic acids with urea and formaldehyde is carried out in a molar ratio of from 1 : 1 : 1 to 1 : 5 : 20, preferably 1 : 2 : 11, and in one or more stages. For instance, the first condensation stage may be followed by a second in which a phenol or a substituted phenol, e.g., o-cresol, and formaldehyde may additionally be used.

Examples of water-soluble salts are ammonium, alkali metal and alkaline earth metal salts, preferably sodium salts.

Examples of conventional solid or liquid carriers are mineral earths such as clays, kaolins, kieselguhrs, bentonites, chalks, quartzes, etc., artificially precipitated silicon dioxides, water, plant-compatible mineral oils, and other solid or liquid carriers conventionally employed in the manufacture of plant protection agents.

The insecticide contains an effective amount of the above-mentioned dispersants, e.g., from 1 to 10% by weight, with reference to the solids content of the insecticide.

The insecticides according to the invention may also contain wetting agents, e.g., non-ionic wetting agents such as oxalkylation products of substituted or unsubstituted phenols and naphthols and salts of their sulfuric acid hemiesters, anionic wetting agents such as water-soluble salts of substituted benzene- or naphthalene- sulfonic acids, and other wetting agents conventionally employed in the manufacture of plant protection agents.

The insecticide according to the invention contains 5 to 95% by weight of active ingredient, 0.1 to 90% by weight of carrier, and 0.1 to 5% by weight of wetting agent.

The insecticide according to the invention may, after dispersion in water, be mixed with a phosphoric ester insecticide, preferably containing O,O-dimethyl-S-(N-methylcarbamoylmethyl)-phosphorus dithioate as active ingredient, the mixture then being employed in conventional manner for insect control.

The phosphoric ester insecticide is added in amounts of from 10 to 100% by weight with reference to the weight of 1-naphthyl-N-methyl carbamate.

The following examples demonstrate the advantageous properties of the new insecticide.

EXAMPLES 1 and 2

Under identical conditions (mixing and grinding in an airjet mill), three dispersible powders of 1-naphthyl-N-methyl carbamate were prepared with the following mixtures (different dispersants, but otherwise the same composition); all percentages are by weight:

| | |
|---|---|
| Active ingredient: | 87% 1-naphthyl-N-methyl carbamate |
| Wetting agent: | 2% of the sodium salt of diisobutylnaphthalene-1-sulfonic acid |
| Carrier: | 2% kaolin + 2% highly disperse silicic acid |
| Dispersant: | 7% lignin sulfonate (comparative agent); |
| | 7% A (Example 1) |
| | 7% B (Example 2) |

A = sodium salt of the condensation product of 1 mole of o-cresol-sulfonic acid, 2 moles of urea and 10.6 moles of formaldehyde, subsequently condensed with 1 mole of o-cresol and 2 moles of formaldehyde.

B = sodium salt of the condensation product of 1 mole of phenol-sulfonic acid, 1 mole of urea and 1.75 moles of formaldehyde, subsequently condensed with 0.75 mole of phenol, 0.13 mole of dioxydiphenyl sulfone and 0.625 mole of formaldehyde.

The samples were stored at room temperature and 50°C, and under a pressure of 100 kg/m² (loaded) and their own pressure (unloaded).

After storage for different periods of time the ability of the samples to form suspensions in 1.5% aqueous solutions and maintain them after 60 minutes was examined (method employed: MT 15, p. 861, CIPAC (Collaborative International Pesticides Analytical Council Ltd.) Handbook, 1970). The following results were obtained:

The suspension is still in perfect condition after 3 hours.

We claim:

| Storage period in months | Comparative product stored at | | | | Example 1 product stored at | | | | Example 2 product stored at | | | |
|---|---|---|---|---|---|---|---|---|---|---|---|---|
| | room temp. | | 50°C | | room temp. | | 50°C | | room temp. | | 50°C | |
| | no load | loaded | no load | loaded | no load | loaded | no load | loaded | no load | loaded | no load | loaded |
| 0  | 80% | —   | —   | —   | 89% | —   | —   | —   | 87% | —   | —   | —   |
| 3  | —   | —   | 77% | 63% | —   | —   | 85% | 83% | —   | —   | 80% | 76% |
| 6  | —   | —   | 75% | 60% | —   | —   | 84% | 79% | —   | —   | 79% | 76% |
| 9  | 80% | 80% | 65% | 42% | 87% | 87% | 78% | 70% | 85% | 85% | 78% | 73% |
| 12 | 75% | 70% | 50% | 40% | 87% | 85% | 78% | 65% | 85% | 84% | 78% | 70% |

These figures show that the insecticides according to the invention have much better storage stability than the agent used for comparison purposes. This is particularly so after fairly long storage periods and high storage temperatures, a factor of special importance for tropical countries where 1-naphthyl-N-methyl carbamate is mainly used.

The active ingredient contents remained unchanged during the whole storage period.

EXAMPLE 3

If a conventional liquid formulation (emulsion concentrate) of O,O-dimethyl-S-(N-methylcarbamoylmethyl)-phosphorus dithioate is added to aqueous suspensions (0.15 to 1.5%) of the prior art comparative agent described above, coarse flocks are formed almost immediately which either settle out or float to the surface.

If the same procedure is adopted with the exception that the comparative agent is replaced by the mixture according to Examples 1 and 2, no flocculation occurs.

We claim:

1. A storage-stable insecticide powder composition comprising 1-naphthyl-N-methyl carbamate dispersed in a solid carrier and, as a dispersant therefor, 1 to 10% by weight, with reference to the solids content of said powder, of the water soluble sodium salt of the condensation product of 1 mole of o-cresol-sulfonic acid, 2 moles of urea and 10.6 moles of formaldehyde, subsequently condensed with 1 mole of o-cresol and 2 moles of formaldehyde.

2. A storage-stable insecticide powder composition comprising 1-naphthyl-N-methyl carbamate dispersed in a solid carrier and, as a dispersant therefor, 1 to 10% by weight, with reference to the solids content of said powder, of the water soluble sodium salt of the condensation product of 1 mole of phenolsulfonic acid, 1 mole of urea and 1.75 moles of formaldehyde, subsequently condensed with 0.75 mole of phenol, 0.13 mole of dioxydiphenyl sulfone and 0.625 mole of formaldehyde.

* * * * *